July 31, 1962  K. RITTER  3,046,744
HYDRAULIC CONTROL APPARATUS
Filed March 29, 1961  3 Sheets-Sheet 1

INVENTOR
Kasper Ritter
BY Michael S. Striker
his ATTORNEY

INVENTOR
Kasper Ritter
BY
his ATTORNEY

July 31, 1962　　　K. RITTER　　　3,046,744
HYDRAULIC CONTROL APPARATUS
Filed March 29, 1961　　　3 Sheets-Sheet 3

INVENTOR
Kasper Ritter
BY Michael S. Striker
his ATTORNEY

# United States Patent Office 3,046,744
Patented July 31, 1962

3,046,744
HYDRAULIC CONTROL APPARATUS
Kaspar Ritter, Kirchheim, Teck, Germany, assignor to Allgaier-Werke G.m.b.H., Uhingen, Wurttemberg, Germany
Filed Mar. 29, 1961, Ser. No. 99,173
20 Claims. (Cl. 60—53)

The present invention relates to a hydraulic control apparatus for varying the transmission ratio of a hydraulic transmission, for example a transmission in which a wobble plate pump drives a wobble plate motor. In transmissions of this type, a pump is provided for pumping liquid under pressure into the transmission. The pressure of this pump can be used to drive a servo piston which operates the means by which the transmission ratio is adjusted.

Known control arrangements serving this purpose have the disadvantage that the comparatively low pressure required for the transmission and supplied by the pump, necessitates the provision of a servo piston having an extremely great cross-section since only in this manner the great forces for the adjustment of the transmission can be produced. The great cross-section of the servo piston and the corresponding cylinder, results in a very slow motion of the piston and of the means which adjust the ratio of the transmission. Moreover, in the control arrangement of the prior art, the supply of the pressure liquid to the transmission is interrupted during the adjustment of the ratio of the transmission, resulting in an interruption of the torque transmitted by the transmission, which is particularly undesirable when the transmission is used for driving the wheels of a vehicle.

It is one object of the present invention to overcome the disadvantages of the prior art constructions providing a servo motor for adjusting a hydraulic transmission, and to provide a hydraulic control apparatus permitting a rapid adjustment of a control element by a comparatively small piston.

Another object of the present invention is to provide a hydraulic control apparatus in which the pressure of a supplied operating liquid is increased when an adjusting operation is required.

Another object of the present invention is to provide a hydraulic control apparatus for a hydraulic transmission in which the comparatively low pressure of a liquid supplied by a pump is increased in the control apparatus to effect a rapid operation of a servo piston under manual control, so that the transmission can be rapidly adjusted without a reduction of the pressure of the fluid supplied by the pump to the transmission.

With these objects in view, the present invention relates to a hydraulic control apparatus which comprises main conduit means including an inlet conduit for a pressure fluid and first and second parallel outlet conduits connected to the inlet conduit; a normally opened first control valve in the first outlet conduit; a normally closed second high pressure control valve in the second outlet conduit; control conduit means connected to the main conduit means and having a discharge opening; a hydraulic control member operated by the pressure of the control conduit means to operate the first control valve; a cylinder communicating with the control conduit means, and a piston in the cylinder; and an operating valve means in the control conduit means including a shiftable valve member having a closing position closing the cylinder, and a connecting position connecting the control conduit means with the discharge opening.

When the valve member is in the position closing the cylinder, the hydraulic control member, for example a control piston in a cylinder chamber of the control conduit means, is subjected to the pressure of the main conduit means and holds the first control valve in the open position. However, when the shiftable valve member connects the control conduit means with the discharge opening, the pressure acting on the control piston is reduced, and the control piston effects closing of the first control valve. As soon as the first control valve is closed, the pressure fluid in the inner conduit builds up the pressure until it is great enough to open the second high pressure control valve which opens and permits discharge of the pressure fluid through the outlet. Since the shiftable valve member in its connecting position connects the inlet conduit with one end of the operating cylinder, and the discharge opening with the other end of the operating cylinder, the operating piston is moved by pressure fluid under the high pressure, and effects adjustment of a controlled element connected thereto.

The control apparatus of the invention advantageously forms part of a novel combination with a hydraulic transmission whose ratio is to be adjusted by the control apparatus. In this arrangement, the above-described main conduit means is a part of a pressure conduit by which a pump is connected to the hydraulic transmission to supply the liquid thereto so that the necessary pressure is maintained in the transmission. The operating piston of the control apparatus is connected to the operating means by which the transmission ratio is adjusted, and actuates the same.

In a preferred embodiment of the invention, a shiftable member, for example a lever, is articulated to the operating piston which controls the operating means of the transmission and also to the shiftable valve member. The lever is also connected to a manually operated means by which the operation is started since a shifting of the lever will result in shifting of the valve member. When the operating piston is displaced by the increased pressure and has adjusted the transmission, it has also moved the shiftable valve member to its closing position, reinstating the initial position of all elements.

In one embodiment of the invention, the first control valve is a slide valve movable transverse to the direction of the conduit in which it is located. In another embodiment, a valve seat is provided in the respective conduit, and the control valve is seated on this valve seat, when in its closed position. In both embodiments of the invention, it is advantageous to provide a throttle intermediate the main conduit means and the control conduit means the pressure of which effects operation of the first control valve. The throttle has the effect that the movement of the operating piston is somewhat dampened so that too rapid changes of the transmission ratio are reliably prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
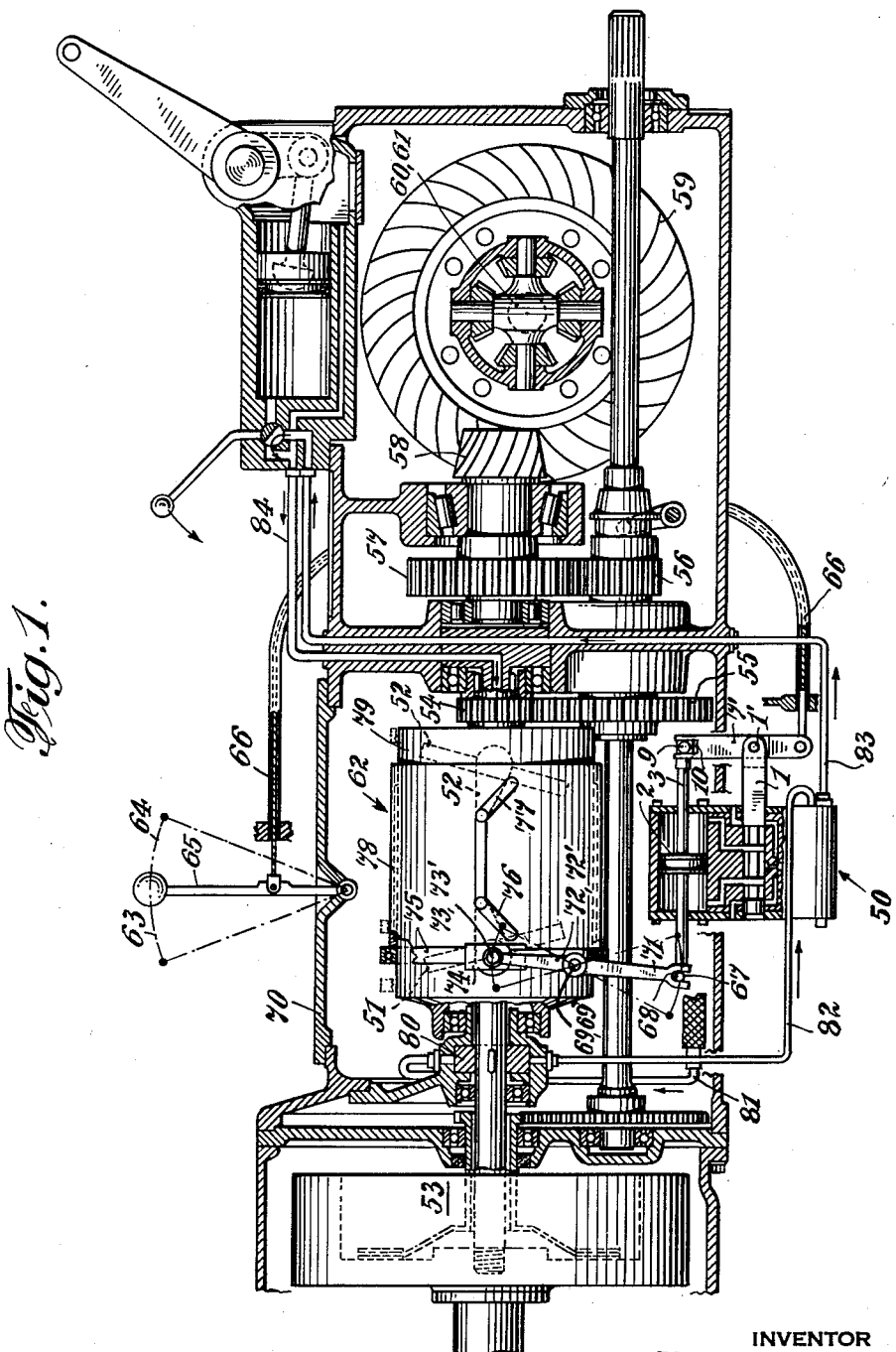
FIG. 1 is a schematic longitudinal sectional view of an apparatus according to the present invention for driving a vehicle, for example a tractor, and including a hydraulic transmission, and a hydraulic control apparatus in accordance with the present invention for varying the transmission ratio under manual control.

Referring now to the drawings, and particularly to FIG. 1, a hydraulic control apparatus 50 according to the present invention, which is actually located within the housing 70, is illustrated in a position turned through an angle of 90° and located outside of the housing 70 in order to facilitate the understanding of the operation. A hydraulic transmission 62 is located in housing 70 and has tiltable members 51 and 52 to which cam follower levers 51' and 52' are secured. A sleeve 78 is shiftable in axial direction of the transmission 62, and has a slot with two portions 76 and 77 receiving cam follower portions of cam follower levers 51' and 52' so that axial shifting of sleeve 78 will effect relative turning of the tiltable members 51 and 52 whereby the wobble plate pump on the left side of transmission 62, and the wobble plate motor on the right side of transmission 62 are adjusted so that the transmission ratio is varied.

The motor of the transmission is connected by a gear 54 to another gear 55 which drives through a gear 56 another gear 57 which is connected to a bevel pinion 58 driving a bevel gear 59 which is connected to the shafts 60, 61 of the tractor wheels.

The wobble plate pump is driven through a shaft from a motor 53 and the variable hydraulic transmission 62 permits an adjustment of the rotary speed of the wheels.

Such adjustment is carried out under control of the manually operated handle 65 which can be moved in the directions of the arrows 63 and 64 from its normal position of rest to two end positions. Handle 65 is connected by Bowden cable 66 to a lever 7 so that the position of lever 7 can be adjusted by manual operation, as will be explained hereinafter in greater detail. Such adjustment effects displacement of an operating piston 2 in the control apparatus 50. Operating piston 2 has a piston rod 3 projecting out of the housing, and having at the end thereof a pair of pins 67 located in slots of a bifurcated end portion 68 of a lever 71. Lever 71 is turnably mounted in housing 70 by means of stud shafts 69 and 69', and has a pair of arms 72 and 72' embracing sleeve 78 and being connected by pivot pins 73, 73' to slide members 74, 74' which are secured to a bearing ring 75 connected to sleeve 78. Consequently, shifting of operating piston 2 will effect turning of lever 71, 72, and displacement of sleeve 78 on the rotating housing 79 of the transmission so that the relative angular position of the tiltable members 51 and 52 is changed, and the transmission ratio is varied. In this manner, the transmission ratio can be adjusted between a reduction ratio of one to infinity and the maximum ratio determined by the construction and dimensions of the axial pistons of the pump and motor, and by the relative angular position of the tiltable members 51 and 52. It will be understood that shifting of sleeve 78 in one direction will result in rotation of the output shaft in forward direction, and shifting of the sleeve 78 in the other direction to its end position will result in reversing of the direction of rotation of the output shaft, and consequently in a rearward motion of the tractor. It is necessary to supply an operating liquid into the hydraulic transmission 62, and a pump 80 is mounted on the shaft of prime mover 53, and pumps the operating liquid, for example oil, from the oil sump of housing 70 through pipe 81. The pressure outlet of pump 80 is connected to a pressure conduit 82 which supplies fluid to a conduit means in the control apparatus 50. The pressure fluid flows from control apparatus 50 into the second portion of the pressure conduit 83 which is connected by a manually operated valve to a third portion 84 of the pressure conduit which communicates with an axial bore in the output shaft of the hydraulic transmission and supplies the pressure fluid to the hydraulic transmission so that losses of liquid taking place during the inner circulation of the liquid between the pump and the motor of hydraulic transmission are replaced. Furthermore, additional liquid is required when certain changes of the transmission ratio take place.

In accordance with the present invention, the pressure fluid of pump 80 which mainly serves the purpose of replacing fluid losses in the transmission, is used for operating a servo motor arrangement including the operating piston 2 by which the transmission ratio is adjusted. However, since the pressure produced by pump 80 is comparatively small and determined by the construction of the hydraulic transmission 62, a very large cross-section of operating piston 2 would be required for producing the great forces necessary for the adjustment of the transmission. For example, the pressure produced by the pump may be approximately 65 to 100 lbs./inch$^2$, which would require a very large piston 2, but in accordance with the present invention the fluid pressure is increased for the operation of piston 2, and may be, for example, between 600 and 1,000 lbs./inch$^2$, resulting in a small operating piston and cylinder.

Figure 2:
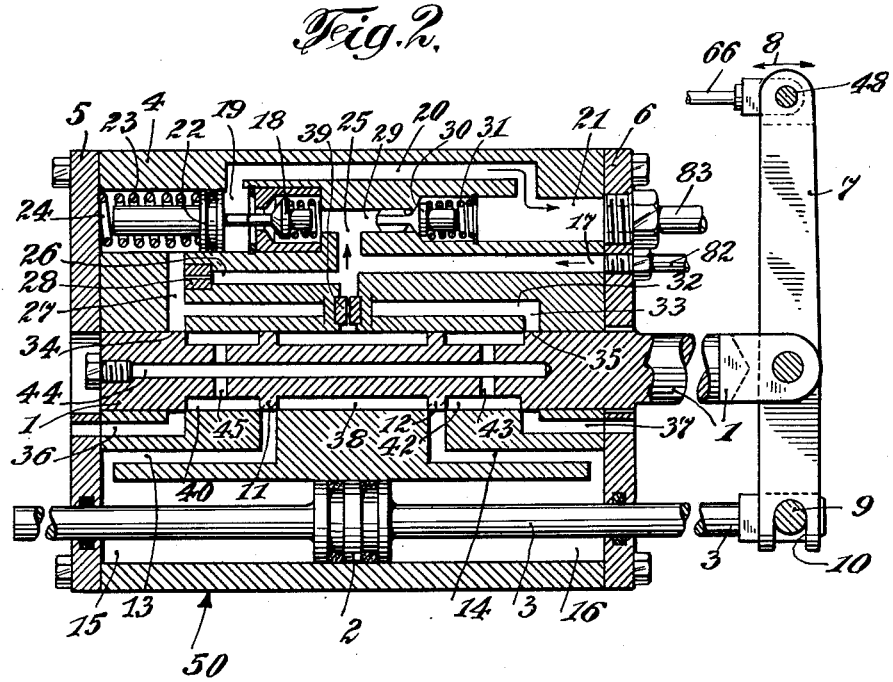
FIG. 2 is a fragmentary axial sectional view illustrating the hydraulic control apparatus according to the present invention on an enlarged scale in a first operational position.
Figure 3:
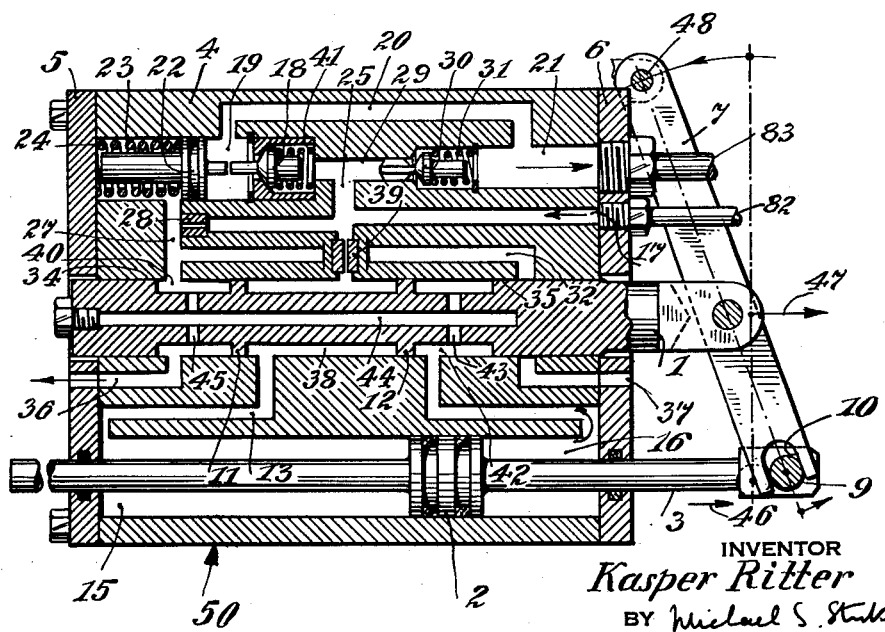
FIG. 3 is a longitudinal sectional view illustrating the control apparatus shown in FIG. 2 in a different operational position in which the transmission ratio of the transmission is adjusted.
Figure 4:
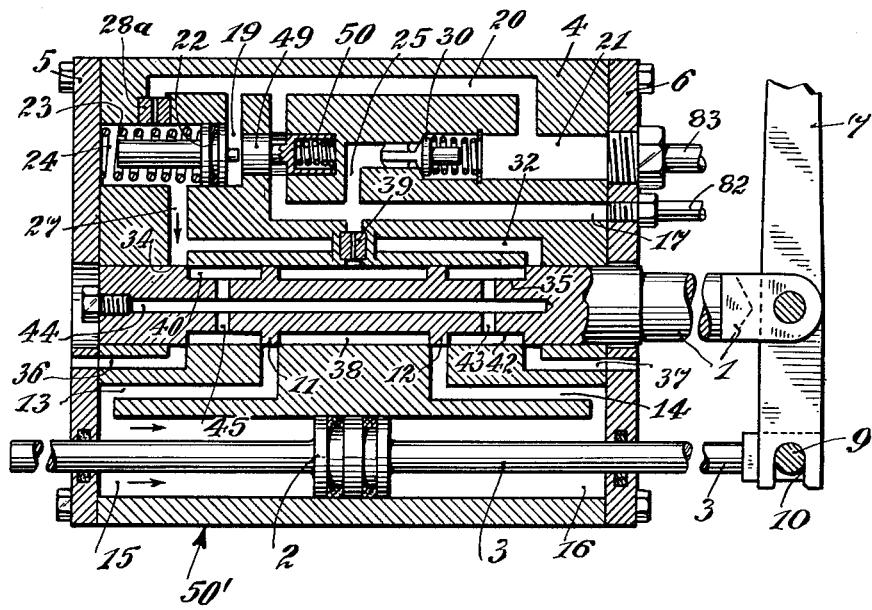
FIG. 4 is a longitudinal sectional view of the control apparatus in accordance with a modified embodiment of the present invention.

However, as soon as the adjustment of the transmission ratio has been completed, the normal low pressure of the liquid is automatically re-established. One embodiment of the hydraulic control apparatus 50 of the present invention is illustrated in FIGS. 2 and 3, and another embodiment 50' is illustrated in FIG. 4. FIGS. 2 and 4 illustrate the respective control arrangement in the normal inoperative position corresponding to the neutral position of handle 65 in FIG. 1. The embodiments 50 and 50' shown in FIGS. 2 and 4 correspond to the apparatus 50 shown in FIG. 1.

In both embodiments of the control apparatus, an operating piston 2 is located in an operating cylinder and has a piston rod 3 projecting from opposite sides of the housing 4 through end plates 5 and 6. As described with reference to FIG. 1, one end of the piston rod 3 is connected to lever 71, while the other end of piston rod 3 is articulated by a pair of pins 9 to the bifurcated slotted end portion 10 of a shiftable lever 7 whose end is connected to Bowden cable 66 to be moved in the direction of the arrow 8 in FIG. 2 when the handle 65 is operated. Lever 7 is articulated to the end of a shiftable valve member 1 which has circular control portions 11, 12 and 34, 35, an inner longitudinal conduit 44, two transverse conduits 43 and 45 and is formed with annular chambers 40, 38 and 42. The cylinder in which operating piston 2 is located is divided into cylinder portions 15 and 16 which are connected to conduits 13 and 14, respectively, which are closed in the position of valve member 1 shown in FIGS. 2 and 4 by the control faces 11 and 12. However, if valve member 1 is shifted to the left to the position shown in FIG. 3, conduit 13 connects the annular chamber 38 with the cylinder portion 15, while conduit 14 connects the annular chamber 42 with the cylinder portion 16. Of course, if valve member 1 is shifted to the right contrary as viewed in FIG. 2, cylinder portion 15 will be connected to annular chamber 40, and cylinder portion 16 will be connected to annular chamber 38.

Since in the position of FIGS. 2 and 4, the valve member 1 closes all conduits connected to cylinder 15, 16, piston 2 cannot move, and if lever 7 is actuated by cable 66, the valve member 1 will be shifted while the pivot connection 9, 10 will momentarily be the fulcrum of lever 7.

An inlet conduit 17 is connected to the pressure conduit 82 of pump 80 and is connected by a conduit 25 to a first outlet conduit 20 which includes a chamber 19 and a valve seat for a spring-loaded first control valve 18. Inlet conduit 17, 25 also communicates with a second outlet conduit 29, 21 in which a second high-pressure control valve 30 is located. Control valve 30 is urged by a spring 31 against its seat, and normally closed. The end of the first outlet conduit 20 opens into the end of the second outlet conduit 21 which is connected to the pressure conduit 83. Consequently, the outlet conduits 19, 20 and 29, 21 are connected in parallel between the inlet conduit 17, 25 and the outlet 83.

Conduit 25 is connected through a throttle 39 to the annular chamber 38 formed by valve member 1. Another conduit 26 is connected to inlet conduit 17, 25 and connected by a throttle 28 to a conduit 27 one end of which is closed in the position of FIG. 2 by the control face 34. The other end of conduit 27 opens into a cylinder 24 in which a control piston 22 is slidably arranged. A spring 23 urges control piston 22 to the right into a position abutting control valve 18 to hold the same in the illustrated open position. Since control valve 18 is open, the pressure of the inlet conduit 17 prevails in the cylinder chamber 19, and when pressure fluid is supplied through conduit 26, throttle 28, and conduit 27 to the cylinder chamber portion 24, the force of spring 23 is sufficient to hold control valve 18 in the open position.

Conduits 17, 25, 20, 29 and 21 may be considered as the main conduit means of the control apparatus, since they connect the inlet pipe 82 with the outlet pipe 83. All other conduits of the apparatus may be considered as control conduit means which are connected to the inlet conduit. The control conduit means further include a conduit 32 connecting conduit 27 with a port 33 closed by control face 35 in the position of FIG. 2. Furthermore, a conduit 36 opens into a discharge opening, and is normally closed by the control face 34, while another conduit 37 opens into a discharge opening and is normally closed by control face 35 of valve member 1.

In the normal position of the control apparatus shown in FIG. 2, the liquid enters inlet conduit 17 at the normal low pressure required for supplying the liquid to the transmission, passes through the open control valve 18 into the outlet conduit 20 and through the end portion of outlet conduit 21 into the portion 83 of the pressure conduit which is connected by conduit 84 to the transmission.

When an adjustment of the ratio of the transmission is desired, handle 63 is operated so that Bowden cable 66 shifts the upper end of lever 7 to the left as viewed in FIG. 2. Since all conduits leading to the cylinder 15, 16 are closed by valve member 1, pivot means 9, 10 provide a momentary fixed fulcrum about which lever 7 turns, so that valve member 1 is displaced to the left as viewed in FIG. 2 and assumes the position shown in FIG. 3. As soon as valve member 1 starts moving, the control faces 11, 12, 34 and 35 of valve member 1 begin to open the correlated conduits. The annular chamber 40 connects conduit 17 to the discharge conduit 36 so that the pressure in the cylinder chamber portion 24 is immediately relieved, and the pressure in chamber 19 is sufficient to shift control piston to the left into the position shown in FIG. 3 so that the projection of control piston 22 no longer abuts the corresponding projection on control valve 18, and spring 41 urges control valve 18 to a closed position. The first outlet conduit 20 is consequently closed by control valve 18, and the pressure fluid supplied through inlet conduit 17 increases the pressure in conduits 25 and 29 until the pressure is increased to such an extent as to open the high-pressure control valve 30 which, in open position, permits discharge of pressure fluid through the second outlet conduit 21.

However, before the valve 30 opens, the pressure in conduit 25 is substantially increased, and pressure fluid passes through throttle 39 into the annular chamber 38, and from there through conduit 13 into cylinder chamber 15 urging piston 2 to the right. At the same time, the annular chamber 42 is connected through conduit 14 to the cylinder chamber 16, so that during movement of piston 2 to the right, fluid is discharged from cylinder chamber 16 into the annular chamber 42 and from there through the transverse conduit 43 and the longitudinal conduit 44 into the transverse conduit 45 and through the annular chamber 40 into the discharge conduit 36.

The movement of piston 2 to the right in the direction of the arrow 46 displaces the pivot means 9, 10 so that, if the pivot connection 48 between lever 7 and Bowden cable 66 is rigidly held by handle 65, valve member 1 will be shifted to the right by the moving piston 2 and its piston rod 3, until valve member 1 is again in its initial position shown in FIG. 2. In this position, all conduits connected to the cylinder 15, 16 are closed so that piston 2 is stopped, while conduit 17 is disconnected from the discharge outlet 36 and supplied with pressure fluid through throttle 28 so that the pressure in the cylinder chamber 24 increases and is soon sufficient to balance the pressure of cylinder chamber 19, so that spring 23 urges control member 22 to the right and effects shifting of control valve 18 to the right so that control valve 18 opens and permits the passage of pressure fluid into the outlet conduit 20. The pressure in conduit 29 is immediately reduced, so that spring 31 closes the high-pressure valve 30.

If handle 65 is shifted in the other direction, the pressure fluid entering annular chamber 38 is supplied through conduit 14 to cylinder chamber 16, while cylinder chamber 15 is connected by conduit 13 and annular chamber 40 to discharge outlet 36. Consequently, piston 2 moves to the left and shifts lever 71 in the opposite direction so that the transmission 62 is adjusted in the opposite sense. Piston 2, moving to the left, takes along valve member 1 so that the same is returned to the left to its initial position shown in FIG. 2. In the position of the valve member 1 displaced to the right, the liquid in cylinder chamber 24 is discharged through conduit 17, conduit 32, annular chamber 42 and discharge conduit 37.

Since the operating piston 2 is shifted in opposite directions by shifting of handle 65, sleeve 78 is shifted in one or the other direction and the relative angular position of members 51 and 52 will be changed under control of cam followers 51' and 52' moving in slots 76 and 77. Thereby, the transmission ratio will be gradually varied during forward or rearward drive of the tractor.

The embodiment of FIG. 4 corresponds in its construction and operation substantially to the embodiment of FIGS. 2 and 3. However, instead of valve 18, a slide valve 49 is provided, which is located in a cylindrical chamber extending transverse to an extension of inlet conduit 17 by which conduit 17 is connected to the outlet conduit 20. A control piston 22 is again provided in a cylinder 24 and is urged by spring 23 to move to the right to abut on valve 49, and to shift the same to the right as viewed in FIG. 4 against the action of the weaker spring 50. The outlet conduit 20 is connected through a throttle 28a to the cylinder chamber portion on the left side of control piston 22, while the outlet conduit 20 is directly connected to the cylinder chamber portion 19 on the other side of control piston 22. As compared to the embodiment of FIG. 2, this arrangement substantially reduces the amount of operating liquid flowing through conduit 27 and discharge conduit 36 when valve member 1 is shifted to the position shown in FIG. 3.

It is necessary that spring 23 is so strong as to be capable of shifting slide valve 49 through control piston 22 to the right against the action of spring 50, although the chamber portions 19 and 24 have the same fluid pressure.

In the position illustrated in FIG. 4, the pressure fluid passes through inlet conduit 17, outlet conduit 20 and through the end of outlet conduit 21 into pipe 83. When valve member 1 is shifted to the left or to the right, as explained with reference to FIG. 3, liquid is discharged from cylinder chamber portion 24 through conduit 27 and conduit 36 so that the pressure in cylinder chamber portion 19 urges control piston 22 to the left against the action of spring 23, permitting spring 50 to push slide valve 49 to the left so that outlet conduit 20 is cut off from inlet conduit 17, and also from cylinder chamber 19. The pressure fluid supplied into inlet conduit 17 builds up pressure until the high pressure valve 30 opens and permits discharge through conduit 21. Fluid under the higher pressure passes through throttle 39, annular chamber 38, and conduit 13 or 14 to cylinder chamber 15 or 16, while the respective other cylinder chamber 16 or 15 discharges through conduit 14, 44 and 36, or through conduits 13, 44 and 37, respectively.

In both embodiments of the invention, the high pressure valve 30 is constructed to open at a pressure of 600 to 1000 lbs./inch$^2$, while the normal pressure in pipe 82, 83, produced by pump 80, may be 65 to 100 lbs./inch$^2$. The pressure is automatically increased when the manually operated means 65 is shifted, and the operating means including lever 72 and sleeve 73 adjust the transmission to a different ratio, whereupon the control apparatus automatically returns to its initial position.

Since the pressure used for shifting the operating piston 2 is ten times as high as the normal pressure, piston 2 and cylinder 15, 16 have a comparatively small cross section, and piston 2 moves rapidly to carry out the adjustment. Furthermore, the small cross section of cylinder 15, 16 reduces the size of the control apparatus so that it can be disposed within the housing 70 in which the transmission is located. FIG. 1 shows the control apparatus 50 outside of housing 70, but this illustration has only been chosen for the sake of clarity and simplicity, while actually the apparatus, together with lever 7 and the pipe connections 82, 83 are completely enveloped by housing 70.

Another advantage of the increased pressure of the fluid, and the reduced cross section of the operating cylinder and piston, resides in the small amount of pressure fluid necessary for effecting displacement of the operating piston 2. Consequently, the amount of fluid supplied by pump 80 to the hydraulic transmission is reduced very little by the use of the pump 80 for operating the means for adjusting the transmission. This is very important, since otherwise an insufficient amount of fluid may be supplied by pump 80 to the transmission 62, which may cause an interruption of the hydraulic coupling between the pump and the motor of the transmission. At the same time, the power required for driving pump 80 is substantially reduced, since the same mainly operates under the low normal pressure required for the transmission, which results in an improvement of the efficiency of the transmission, and moreover increases the span of life of pump 80 during which the pump reliably operates.

The throttle 39 through which the inlet conduit 17 is connected to the control conduits of the operating cylinder 15, 16, dampens the movement of piston 2 so that too sudden changes of the transmission ratio are prevented.

Cylinder chamber 19 is directly connected to a pressure conduit so that control piston 22 can rapidly move to the left to effect closing of the valve 18 or 49. On the other hand, cylinder chamber 24 is connected to a pressure conduit by a throttle 28 or 28a, so that the certain time is required until the full pressure is reestablished in cylinder chamber 24 after the same has been connected to a discharge opening by shifting of valve member 1. A comparatively small cross section of cylinder 24 and control piston 22 is required so that the size of the apparatus is further reduced as compared with known constructions.

The embodiment of FIG. 4 provides the throttle 28a between the outlet conduit 20 and the cylinder chamber portion 24 which is particularly advantageous, since it further reduces the amount of liquid lost through a discharge opening during operation of valve 1 and adjustment of the transmission ratio. Another advantage of the embodiment of FIG. 4 resides in the fact that the slide valve 49 does not have to overcome fluid pressure during shifting, so that it can be operated by a comparatively small force.

It will be understood that each of the elements described above, or two or more together, may also find a useful application in other types of hydraulic apparatus differing from the types described above.

While the invention has been illustrated and described as embodied in a hydraulic control apparatus for temporarily producing a high fluid pressure for operating a servo piston controlling the ratio of a hydraulic transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A hydraulic control apparatus comprising, in combination, main conduit means including an inlet conduit for a pressure fluid and first and second parallel outlet conduits connected to said inlet conduit; a normally open first control valve in said first outlet conduit; a normally closed second high pressure control valve in said second outlet conduit adapted to open when the pressure in said second outlet conduit increases due to closing of said first control valve; control conduit means connected to said main conduit means and having a discharge opening; a hydraulic control member operated by the pressure in said control conduit means to operate said first control valve; an operating cylinder communicating with said control conduit means, and an operating piston in said operating cylinder adapted to be connected to a controlled element for shifting the same; and an operating valve means in said control conduit means including a shiftable valve member having a closing position closing said operating cylinder, and a connecting position connecting said control conduit means with said discharge opening to effect closing of said first control valve by said hydraulic control member and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

2. A hydraulic control apparatus comprising, in combination, main conduit means including an inlet conduit for a pressure fluid and first and second parallel outlet conduits connected to said inlet conduit; a normally open first control valve in said first outlet conduit; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve and dividing said cylinder chamber into two chamber portions, said chamber portions communicating with said main conduit means; an operating cylinder communicating with said control conduit means, and an operating piston in said operating cylinder adapted to be connected to a controlled element for shifting the same; and an operating valve means in said control conduit means including a shiftable valve member having a closing position disconnecting said operating cylinder from said inlet conduit, from said cylinder chamber, and from said discharge opening, and a connecting position connecting one of said chamber portions of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

3. A hydraulic control apparatus comprising, in combination, main conduit means including an inlet conduit for a pressure fluid and first and second parallel outlet conduits connected to said inlet conduit; a normally open first control valve in said first outlet conduit; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve and dividing said cylinder chamber into two chamber portions, one of said chamber portions communicating with said inlet conduit, and the other chamber portion communicating with at least one of said outlet conduits; an operating cylinder communicating with said control conduit means, and an operating piston in said operating cylinder adapted to be connected to a controlled element for shifting the same; and an operating valve means in said control conduit means including a shiftable valve member having a closing position disconnecting said operating cylinder from said inlet conduit, from said cylinder chamber, and from said discharge opening, and a connecting position connecting said one chamber portion of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

4. A hydraulic control apparatus comprising, in combination, main conduit means including an inlet conduit for a pressure fluid and first and second parallel outlet conduits connected to said inlet conduit; a normally open first control valve in said first outlet conduit; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve and dividing said cylinder chamber into two chamber portions, one of said chamber portions communicating with said inlet conduit, and the other chamber portion communicating with at least one of said outlet conduits; a throttle intermediate said one chamber portion and inlet conduit; an operating cylinder communicating with said control conduit means, and an operating piston in said operating cylinder adapted to be connected to a controlled element for shifting the same; and an operating valve means in said control conduit means including a shiftable valve member having a closing position disconnecting said operating cylinder from said inlet conduit, from said cylinder chamber, and from said discharge opening, and a connecting position connecting said one chamber portion of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

5. A hydraulic control apparatus comprising, in combination, main conduit means including an inlet conduit for a pressure fluid and first and second parallel outlet conduits connected to said inlet conduit; a normally open first control valve in said first outlet conduit; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve and dividing said cylinder chamber into two chamber portions, said chamber portions communicating with at least one of said outlet conduits; a throttle intermediate one of said chamber portions and said outlet conduit; an operating cylinder communicating with said control conduit means, and an operating piston in said operating cylinder adapted to be connected to a controlled element for shifting the same; and an operating valve means in said control conduit means including a shiftable valve member having a closing position disconnecting said operating cylinder from said inlet conduit, from said cylinder chamber, and from said discharge opening, and a connecting position connecting said one chamber portion of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

6. A hydraulic control apparatus comprising, in combination, main conduit means including an inlet conduit for a pressure fluid and first and second parallel outlet conduits connected to said inlet conduit; a normally open first control valve in said first outlet conduit; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve and dividing said cylinder chamber into two chamber portions, said chamber portions communicating with said main conduit means; a throttle intermediate one of said chamber portions and said main conduit means; an operating cylinder communicating with said control conduit means, and an operating piston in said operating cylinder adapted to be connected to a controlled element for shifting the same; and an operating valve means in said control conduit means including a shiftable valve member having a closing position disconnecting said operating cylinder from said inlet conduit, from said cylinder chamber, and from said discharge opening, and a connecting position connecting said one chamber portion of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

7. A hydraulic control apparatus comprising, in combination, main conduit means including an inlet conduit for a pressure fluid and first and second parallel outlet conduits connected to said inlet conduit; a normally open first control valve in said first outlet conduit; a spring biasing said first control valve to close; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve abutting the same and dividing said cylinder chamber into two chamber portions, said chamber portions communicating with said main conduit means; spring means in said cylinder chamber for urging said control piston and thereby said first control valve against the action of said spring to a position in which said first control valve is closed; an operating cylinder communicating with said control conduit means, and an operating piston in said operating cylinder adapted to be connected to a controlled element for shifting the same; and an operating valve means in said control conduit means including a shiftable valve member having a closing position disconnecting said operating cylinder from said inlet conduit, from said cylinder chamber, and from said discharge opening, and a connecting position connecting one of said chamber portions of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

8. A hydraulic apparatus as set forth in claim 7 wherein said first control valve is a slide valve moving transverse to said first outlet conduit.

9. A hydraulic apparatus as set forth in claim 7 wherein said first outlet conduit has a valve seat, said first control valve being seated on said valve seat.

10. In hydraulic apparatus of the type described, in combination, a hydraulic transmission; a pump; a pressure conduit means for connecting said pump with said transmission for maintaining a selected fluid pressure in the same; operating means for adjusting said hydraulic transmission to vary the transmission ratio thereof and a hydraulic control apparatus comprising a main conduit means connected into said pressure conduit means and including an inlet conduit for the pressure fluid pumped by said pump through said pressure conduit means, and first and second parallel outlet conduits connected to said inlet conduit and opening into said pressure conduit means, a normally open first control valve in said first outlet conduit; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve and dividing said cylinder chamber into two chamber portions, said chamber portions communicating with said main conduit means; an operating cylinder communicating with said control conduit means, and an operating piston in said operating cylinder connected to said operating means for shifting the same; and an operating valve means in said control conduit means including a shiftable valve member having a closing position disconnecting said operating cylinder from said inlet conduit, from said cylinder chamber, and from said discharge opening, and a connecting position connecting one of said chamber portions of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

11. In hydraulic apparatus of the type described, in combination, a hydraulic transmission; a pump; a pressure conduit means for connecting said pump with said transmission for maintaining a selected fluid pressure in the same; operating means for adjusting said hydraulic transmission to vary the transmission ratio thereof a hydraulic control apparatus comprising a main conduit means connected into said pressure conduit means and including an inlet conduit for the pressure fluid pumped by said pump through said pressure conduit means, and first and second parallel outlet conduits connected to said inlet conduit and opening into said pressure conduit means, a normally open first control valve in said first outlet conduit; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve and dividing said cylinder chamber into two chamber portions, said chamber portions communicating with said main conduit means; an operating cylinder communicating with said control conduit means, and an operating piston in said operating cylinder, connected to said operating means and an operating valve means in said control conduit means including a shiftable valve member having a closing position disconnecting said operating cylinder from said inlet conduit, from said cylnder chamber, and from said discharge opening, and a connecting position connecting one of said chamber portions of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure; shifting member connected to said valve member and to said operating piston; and manually operated means connected to said shifting member for shifting the same so that said valve member is shifted from said closing position to said connecting position whereby said operating piston is moved and shifts through said shifting member said valve member back to said closing position.

12. In hydraulic apparatus of the type described, in combination, a hydraulic transmission; a pump; a pressure conduit means for connecting said pump with said transmission for maintaining a selected fluid pressure in the same; operating means for adjusting said hydraulic transmission to vary the transmission ratio thereof and a hydraulic control apparatus comprising a main conduit means connected into said pressure conduit means and including an inlet conduit for the pressure fluid pumped by said pump through said pressure conduit means, and first and second parallel outlet conduits connected to said inlet conduit and opening into said pressure conduit means, a normally open first control valve in said first outlet conduit; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve and dividing said cylinder chamber into two chamber portions, said chamber portions communicating with said main conduit means; an operating cylinder communicating with said control conduit means, and an operating piston in said operating cylinder, connected to said operating means and an operating valve means in said control conduit means including a shiftable valve member having a closing position disconnecting said operating cylinder from said inlet conduit, from said cylinder chamber, and from said discharge opening, and a connecting position connecting one of said chamber portions of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure; a lever means articulated to said valve member for shifting the same, and articulated to said operating piston to be shifted by the same; and manually operated means connected to said lever means for shifting the same so that said valve member is shifted from said closing position to said connecting position whereby said operating piston is moved and shifts through said lever means said valve member back to said closing position.

13. A hydraulic control apparatus as set forth in claim 12 wherein said manually operated means includes a handle, and a Bowden cable connecting said handle with said lever means.

14. A hydraulic control apparatus as set forth in claim 12 wherein said hydraulic transmission includes a wobble plate pump and a wobble plate motor; and wherein said operating means include a forked lever connected to said operating piston, a sleeve shiftably mounted in said hydraulic transmission and being partly embraced by said forked lever to be shifted by the same, said lever having a cam slot, and cam follower means located in said cam slot and operatively connected to said wobble plate pump and wobble plate motor to vary the transmission ratio of said hydraulic transmission.

15. In hydraulic apparatus of the type described, in combination, a hydraulic transmission including a wobble plate pump and a wobble plate motor; a pump; a pressure conduit means for connecting said pump with said transmission for maintaining a selected fluid pressure in the same; operating means for adjusting said hydraulic transmission to vary the transmission ratio thereof; a hydraulic control apparatus comprising a main conduit means connected into said pressure conduit means and including an inlet conduit for the pressure fluid pumped by said pump through said pressure conduit means, and first and second parallel outlet conduits connected to said inlet conduit and opening into said pressure conduit means, a normally open first control valve in said first outlet conduit; a normally closed second high pressure control valve in said second outlet conduit adapted to open when the pressure in said second outlet conduit increases due to closing of said first control valve; control conduit means connected to said inlet conduit, having a discharge opening, and including a cylinder chamber; a control piston in said cylinder chamber for operating said first control valve and dividing said cylinder chamber into two chamber portions, said chamber portions communicating with said main conduit means; a throttle intermediate one of said chamber portions and said main conduit means; an operating cylinder communicating with said control conduit means, and an operating piston in said operating cylinder, connected to said operating means and an operating valve means in said control conduit means including a shiftable valve member having a closing position disconnecting said operating cylinder from said inlet conduit, from said cylinder chamber, and from said discharge opening, and a connecting position connecting said one chamber portion of said cylinder chamber with said discharge opening to effect closing of said first control valve and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure; shifting member connected to said valve member and to said operating piston; and manually operated means connected to said shifting member for shifting the same so that said valve member is shifted from said closing position to said connecting position whereby said operating piston is moved and shifts through said shifting member said valve member back to said closing position.

16. In hydraulic apparatus of the type described, in combination, a hydraulic transmission including a wobble plate pump and a wobble plate motor; a pump; a pressure conduit means for connecting said pump with said transmission for maintaining a selected fluid pressure in the same; operating means for adjusting said hydraulic transmission to vary the transmission ratio thereof and a hydraulic control apparatus comprising a main conduit means connected into said pressure conduit means and including an inlet conduit for the pressure fluid pumped by said pump through said pressure conduit means, and first and second parallel outlet conduits connected to said inlet conduit and opening into said pressure conduit means, a normally open first control valve in said first outlet conduit; a normally closed second high pressure control valve in said second outlet conduit adapted to open when the pressure in said second outlet conduit increases due to closing of said first control valve; control conduit means connected to said main conduit means and having a discharge opening; a hydraulic control member operated by the pressure in said control conduit means to operate said first control valve; an operating cylinder communicating with said control conduit means, and an operating piston in said operating cylinder connected to said operating means for shifting the same; and an operating valve means in said control conduit means including a shiftable valve member having a closing position closing said operating cylinder, and a connecting position connecting said control conduit means with said discharge opening to effect closing of said first control valve by said hydraulic control member and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

17. In hydraulic apparatus of the type described, in combination, a hydraulic transmission including a wobble plate pump and a wobble plate motor a pump; a pressure conduit means for connecting said pump with said transmission for maintaining a selected fluid pressure in the same; operating means for adjusting said hydraulic transmission to vary the transmission ratio thereof and a hydraulic control apparatus comprising a main conduit means connected into said pressure conduit means and including an inlet conduit for the pressure fluid pumped by said pump through said pressure conduit means, and first and second parallel outlet conduits connected to said inlet conduit and opening into said pressure conduit means, a normally open first control valve in said first outlet conduit; a normally closed second high pressure control valve in said second outlet conduit adapted to open when the pressure in said second outlet conduit increases due to closing of said first control valve; control conduit means connected to said main conduit means and having a discharge opening; a throttle intermediate said main conduit means and said control conduit means; a hydraulic control member operated by the pressure in said control conduit means to operate said first control valve; an operating cylinder communicating with said control conduit means, and an operating piston in said operating cylinder connected to said operating means for shifting the same; and an operating valve means in said control conduit means including a shiftable valve member having a closing position closing said operating cylinder, and a connecting position connecting said control conduit means with said discharge opening to effect closing of said first control valve by said hydraulic control member and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

18. In hydraulic apparatus of the type described, in combination, a hydraulic transmission; a pump; a pressure conduit means for connecting said pump with said transmission for maintaining a selected fluid pressure in the same; operating means for adjusting said hydraulic transmission to vary the transmission ratio thereof; a hydraulic control apparatus comprising a main conduit means connected into said pressure conduit means and including an inlet conduit for the pressure fluid pumped by said pump through said pressure conduit means, and first and second parallel outlet conduits connected to said inlet conduit and opening into said pressure conduit means, a normally open first control valve in said first outlet conduit; a normally closed second high pressure control valve in said second outlet conduit adapted to open when the pressure in said second outlet conduit increases due to closing of said first control valve; control conduit means connected to said main conduit means and having a discharge opening; a hydraulic control member operated by the pressure in said control conduit means to operate said first control valve; an operating cylinder communicating with said control conduit means, and an operating piston in said operating cylinder, connected to said operating means and an operating valve means in said control conduit means including a shiftable valve member having a closing position closing said operating cylinder, and a connecting position connecting said control conduit means with said discharge opening to effect closing of said first control valve by said hydraulic control member and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure; shifting member connected to said valve member and to said operating piston; and manually operated means connected to said shifting member for shifting the same so that said valve member is shifted from said closing position to said connecting position whereby said operating piston is moved and shifts through said shifting member said valve member back to said closing position.

19. A hydraulic control apparatus as set forth in claim 18 wherein said hydraulic transmission includes a wobble plate pump and a wobble plate motor; and wherein said operating means include a forked lever connected to said operating piston, a sleeve shiftably mounted in said hydraulic transmission and being partly embraced by said forked lever to be shifted by the same, said sleeve having a cam slot, and cam follower means located in said cam slot and operatively connected to said wobble plate pump and wobble plate motor to vary the transmission ratio of said hydraulic transmission.

20. A hydraulic control apparatus comprising, in combination, main conduit means including an inlet conduit for a pressure fluid and first and second parallel outlet conduits connected to said inlet conduit; a normally open first control valve in said first outlet conduit; a normally closed second high pressure control valve in said second outlet conduit adapted to open when the pressure in said second outlet conduit increases due to closing of said first control valve; control conduit means connected to said main conduit means and having a discharge opening; a throttle intermediate said main conduit means and said control conduit means; a hydraulic control member operated by the pressure in said control conduit means to operate said first control valve; an operating cylinder communicating with said control conduit means, and an operating piston in said operating cylinder adapted to be connected to a controlled element for shifting the same; and an operating valve means in said control conduit means including a shiftable valve member having a closing position closing said operating cylinder, and a connecting position connecting said control conduit means with said discharge opening to effect closing of said first control valve by said hydraulic control member and thereby a pressure increase in said inlet conduit until said second high pressure control valve opens, and connecting said inlet conduit with one end of said operating cylinder and said discharge opening with the other end of said operating cylinder so that said operating piston is moved by the pressure fluid under said high pressure.

No references cited.